United States Patent
Lin et al.

(10) Patent No.: US 11,287,735 B2
(45) Date of Patent: Mar. 29, 2022

(54) DIFFUSION ROTATING DEVICE AND PROJECTION DEVICE

(71) Applicant: Coretronic Corporation, Hsin-Chu (TW)

(72) Inventors: Shi-Hao Lin, Hsin-Chu (TW); Chung-Cheng Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 20 days.

(21) Appl. No.: 16/929,059

(22) Filed: Jul. 14, 2020

(65) Prior Publication Data

US 2021/0018825 A1 Jan. 21, 2021

(30) Foreign Application Priority Data

Jul. 17, 2019 (CN) .......................... 201910644999.6

(51) Int. Cl.
*G03B 21/20* (2006.01)
*G02B 5/02* (2006.01)
*G02B 26/00* (2006.01)

(52) U.S. Cl.
CPC ......... *G03B 21/208* (2013.01); *G03B 21/204* (2013.01); *G02B 5/0263* (2013.01); *G02B 26/008* (2013.01)

(58) Field of Classification Search
CPC .. G03B 21/208; G03B 21/204; G02B 5/0263; G02B 26/008
See application file for complete search history.

(56) References Cited

U.S. PATENT DOCUMENTS

| 2014/0118991 A1* | 5/2014 | Lin | G02B 26/008 |
| | | | 362/84 |
| 2019/0353997 A1* | 11/2019 | Hsu | G02B 26/008 |

FOREIGN PATENT DOCUMENTS

| CN | 107065413 | 8/2017 | |
| CN | 208172483 U * | 11/2018 | .......... G03B 21/208 |
| TW | I634380 | 9/2018 | |

* cited by examiner

*Primary Examiner* — Ryan D Howard
(74) *Attorney, Agent, or Firm* — JCIPRNET

(57) ABSTRACT

A diffusion rotating device disposed on a transmission path of a light beam is provided. The diffusion rotating device includes a substrate, a rotating axis and a driving element. The rotating axis is connected to the substrate. The driving element is connected to the rotating axis, and drives the rotating axis to rotate. The substrate includes a first diffusion region and an optical region disposed adjacent to each other, and the first diffusion region has multiple first diffusion sub-regions, each of the first diffusion sub-regions extends along a circumferential direction of the substrate and the first diffusion sub-regions are arranged concentrically along a radial direction of the substrate, when the first diffusion region is cut into the transmission path of the light beam, the light beam forms a first light spot on the first diffusion region of the substrate. A projection device is also provided.

19 Claims, 8 Drawing Sheets

DIFFUSION ROTATING DEVICE AND PROJECTION DEVICE

CROSS-REFERENCE TO RELATED APPLICATION

This application claims the priority benefit of China application serial no. 201910644999.6, filed on Jul. 17, 2019. The entirety of the above-mentioned patent application is hereby incorporated by reference herein and made a part of this specification.

BACKGROUND

Technical Field

The disclosure relates to a rotating device and an optical device, and particularly relates to a diffusion rotating device and a projection device.

Description of Related Art

In a framework of a laser projector, a blue laser beam is mainly adopted to sequentially irradiate a phosphor region and a reflection region (or a penetration region) of a phosphor wheel to output yellow light and blue light correspondingly, and a filter element in the laser projector is adopted to extract a required color light (green light or/and red light) from the wide band yellow light. In order to achieve an ideal energy distribution of a laser light spot formed on the phosphor wheel, a light spot shaping element may be adopted to adjust the light spot of the blue laser beam. However, the general light spot shaping element cannot individually optimize different phosphor regions on the phosphor wheel, and the blue laser beams irradiating different regions of the phosphor wheel form expanded light spots in order to match an energy density required by the phosphor region, resulting in a decrease in the efficiency of blue light.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art of the disclosure.

SUMMARY

The disclosure is directed to a diffusion rotating device, which makes a projection device using the diffusion rotating device to have good optical efficiency.

The disclosure is directed to a projection device, which has good optical efficiency.

Other objects and advantages of the disclosure may be further illustrated by the technical features broadly embodied and described as follows.

In order to achieve one or a portion of or all of the objects or other objects, an embodiment of the disclosure provides a diffusion rotating device disposed on a transmission path of a light beam. The diffusion rotating device includes a substrate, a rotating axis and a driving element. The rotating axis is connected to the substrate. The driving element is connected to the rotating axis, and is configured to drive the rotating axis to rotate. The substrate includes a first diffusion region and an optical region disposed adjacent to each other, and the first diffusion region has a plurality of first diffusion sub-regions, wherein each of the plurality of first diffusion sub-regions extends along a circumferential direction of the substrate and the plurality of first diffusion sub-regions are arranged concentrically along a radial direction of the substrate, wherein when the first diffusion region is cut into the transmission path of the light beam, the light beam forms a first light spot on the first diffusion region of the substrate, and in the radial direction of the substrate, a diffusivity of the first diffusion sub-region corresponding to a central portion of the first light spot in the plurality of first diffusion sub-regions is greater than a diffusivity of the first diffusion sub-regions corresponding to an edge portion of the first light spot.

In order to achieve one or a portion of or all of the objects or other objects, an embodiment of the disclosure provides a projection device including an illumination system, at least one light valve and a projection lens. The illumination system is configured to provide an illumination beam, and the illumination system includes a first light source, the aforementioned diffusion rotating device and a light wavelength conversion element. The at least one light valve is disposed on a transmission path of the illumination beam to modulate the illumination beam into an image beam. The projection lens is disposed on a transmission path of the image beam. The first light source is configured to emit a first beam. The diffusion rotating device is disposed on a transmission path of the first beam, and the first diffusion region and the optical region are sequentially cut into the transmission path of the first beam. The light wavelength conversion element is disposed on the transmission path of the first beam coming from the diffusion rotating device, and the light wavelength conversion element includes a first wavelength conversion region and an optical effect region disposed adjacent with each other, wherein the first wavelength conversion region is correspondingly cut into the transmission path of the first beam coming from the first diffusion region, and the optical effect region is correspondingly cut into the transmission path of the first beam coming from the optical region, and the first wavelength conversion region is configured to convert the first beam coming from the first diffusion region into a first converted beam, and the illumination beam includes the first converted beam.

Based on the above description, the embodiments of the disclosure have at least one of following advantages or effects. The driving element of the diffusion rotating device of the disclosure is configured to drive the rotating axis connected to the substrate to rotate, and the substrate of the diffusion rotating device includes the first diffusion region and the optical region disposed adjacent to each other, so that the diffusion rotating device may individually optimize the light spot of the light beam through different partitions, and the light beam passing through the diffusion rotating device may have different light spot energy density at different timings. Moreover, the first diffusion region has a plurality of first diffusion sub-regions, and when the first diffusion region is cut into the transmission path of the light beam, the light beam forms a first light spot on the first diffusion region of the substrate, and in the radial direction of the substrate, a diffusivity of the first diffusion sub-region corresponding to a central portion of the first light spot in the plurality of first diffusion sub-regions is greater than a diffusivity of the first diffusion sub-regions corresponding to an edge portion of the first light spot. Therefore, the first diffusion sub-regions may further optimize the energy distribution of the first light spot, so that the energy of the first light spot is not excessively concentrated in the central portion. In this way, the projection device applying the diffusion rotating device may implement individual optimization on different partitions of the light wavelength conversion region. Moreover, the light spot energy of the light beam irradiating the first wavelength conversion region is not excessively concentrated to the central portion, which results in better light conversion efficiency and it is not easy to burn the light wavelength conversion element. Therefore, the projection device of the disclosure has good optical efficiency.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "left," "right," "front," "back," etc., is used with reference to the orientation of the Figure(s) being described and are not intended to be limiting of the disclosure.

Figure 1:
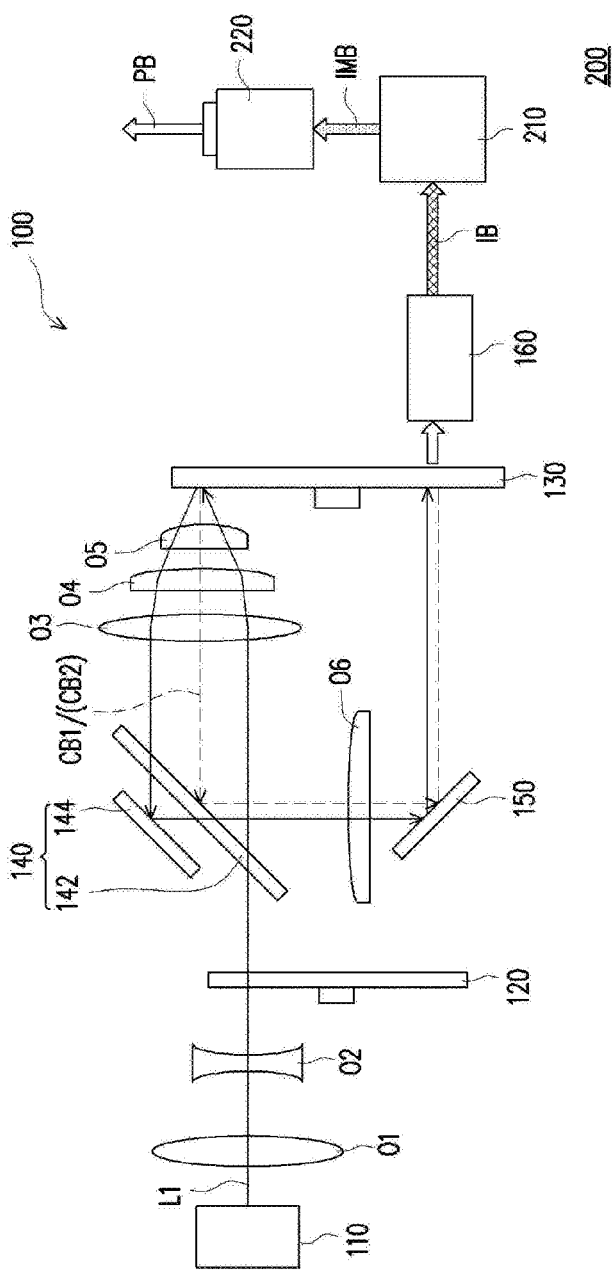
FIG. 1 is a schematic diagram of a projection device according to a first embodiment of the disclosure.

FIG. 1 is a schematic diagram of a projection device according to a first embodiment of the disclosure. Referring to FIG. 1, the projection device 200 of the embodiment is configured to provide a projection beam PB, and the projection device 200 includes an illumination system 100, at least one light valve 210 and a projection lens 220. The illumination system 100 is configured to provide an illumination beam IB. The at least one light valve 210 is disposed on a transmission path of the illumination beam IB to modulate the illumination beam IB into an image beam IMB. The projection lens 220 is disposed on a transmission path of the image beam IMB, and is configured to receive the image beam IMB from the at least one light valve 210 to produce the projection beam PB, and projects the projection beam PB onto a screen, a whiteboard or a wall (not shown) to form an image. Since after the illumination beam IB of different colors irradiate the at least one light valve 210, the at least one light valve 210 sequentially converts the illumination beam IB of different colors into the image beam IMB in timing for transmitting to the projection lens 220, the image beam IMB converted by the at least one light valve 210 is converted by the projection lens 200 to generate the projection beam PB, and the image formed by the projection beam PB projected out of the projection device 200 becomes a color image.

In the embodiment, the light valve 210 is, for example, a Digital Micro-mirror Device (DMD) or a Liquid-Crystal-On-Silicon (LCOS) panel. However, in other embodiments, the light valve 210 may also be a transmissive liquid crystal panel or other spatial light modulator. Moreover, the number of the light valves 210 of the embodiment is not limited by the disclosure. In the embodiment, the projection lens 220 is, for example, one optical lens with a refractive power or a combination of a plurality of optical lenses, and the optical lens, for example, includes a non-planar lens such as a biconcave lens, a biconvex lens, a concavo-convex lens, a convexo-concave lens, a plano-convex lens, a plano-concave lens, etc, or various combinations thereof. The pattern and type of the projection lens 220 are not limited by the disclosure.

As shown in FIG. 1, the illumination system 100 includes a first light source 110, a diffusion rotating device 120 and a light wavelength conversion element 130. The first light source 110 is configured to emit a first beam. The diffusion rotating device 120 is disposed on a transmission path of the first beam L1. The light wavelength conversion element 130 is disposed on the transmission path of the first beam L1 coming from the diffusion rotating device 120. The diffusion rotating device 120 is disposed between the first light source 110 and the light wavelength conversion element 130.

In the embodiment, the first light source 110 is generally referred to as a light source that may emit a short-wavelength beam, and a peak wavelength of the short-wavelength beam falls, for example, within a wavelength range of blue light or ultraviolet light, where the peak wavelength is defined as the wavelength corresponding to the maximum intensity of light. The first light source 110 includes a Laser Diode (LD), a Light Emitting Diode (LED) or a bank or a group composed of the LDs or the LEDs, but the disclosure is not limited thereto. In the embodiment, the first light source 110 is laser light emitting elements including laser diodes. For example, the first light source 110 is, for example, a blue laser diode bank, and the first beam L1 is a blue laser beam, but the disclosure is not limited thereto.

Figure 2B:
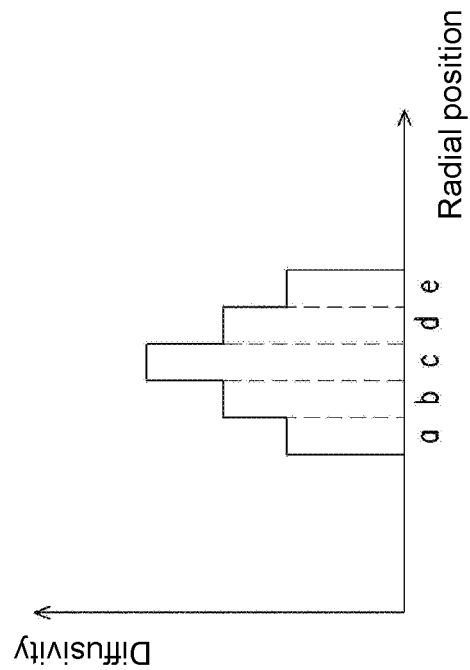
FIG. 2B is a distribution diagram of diffusivities of a first diffusion region in FIG. 2A.
Figure 2A:
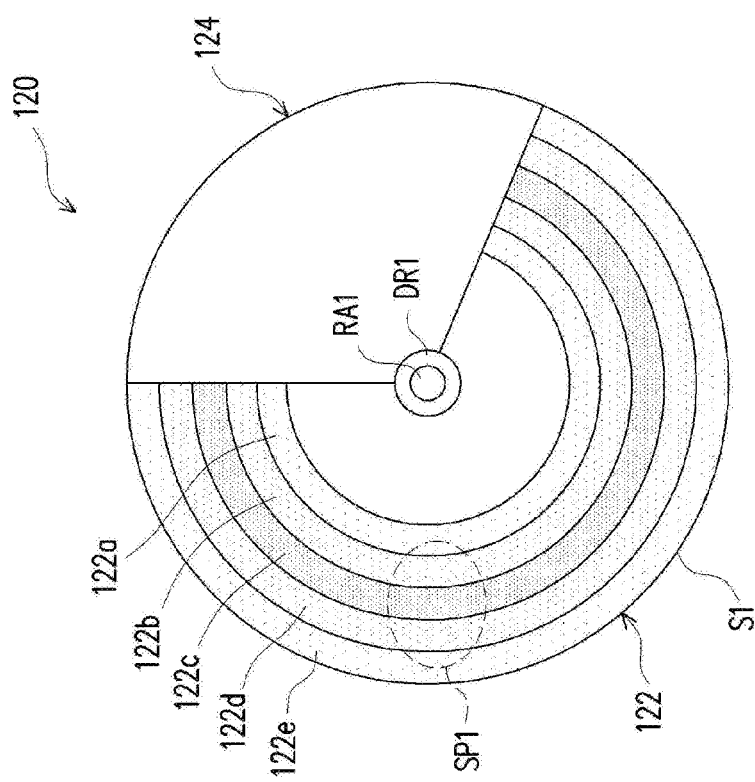
FIG. 2A is a front view of a diffusion rotating device of FIG. 1.

FIG. 2A is a front view of the diffusion rotating device of FIG. 1. FIG. 2B is a distribution diagram of diffusivities of a first diffusion region in FIG. 2A. Referring to FIG. 2A, the diffusion rotating device 120 is a rotatable disk-like device, which includes a substrate S1, a rotating axis RA1 and a driving element DR1. The rotating axis RA1 is connected to the substrate S1. The driving element DR1 is connected to the rotating axis RA1, and is configured to drive the rotating axis RA1 to rotate and accordingly drive the substrate S1 to rotate. The substrate S1 includes a first diffusion region 122 and an optical region 124 disposed adjacent to each other. The first diffusion region 122 has a plurality of first diffusion sub-regions (for example, a first diffusion sub-region 122a to a first diffusion sub-region 122e shown in FIG. 2A), where each of the first diffusion sub-regions (the first diffusion sub-region 122a to the first diffusion sub-region 122e) extends along a circumferential direction of the substrate S1 and the first diffusion sub-regions (the first diffusion sub-region 122a to the first diffusion sub-region 122e) are arranged concentrically along a radial direction of the substrate S1. The optical region 124 is, for example, a light penetration region, which is, for example, formed by glass or other transparent plate, and the optical region 124 may also be a hollow region on the substrate S1.

In the embodiment, when the substrate S1 of the diffusion rotating device 120 is rotated, the first diffusion region 122 and the optical region 124 are sequentially cut into the transmission path of the first beam L1 emitted from the first light source 110. When the first diffusion region 122 is cut into the transmission path of the first beam L1, the first beam L1 forms a first light spot SP1 on the first diffusion region 122 of the substrate S1, a range of the first light spot SP1 may, for example, cover at least two of the first diffusion sub-region 122a to the first diffusion sub-region 122e and in the radial direction of the substrate S1, a diffusivity of the first diffusion sub-region (for example, the first diffusion sub-region 122c) corresponding to a central portion of the first light spot SP1 in the plurality of first diffusion sub-regions is greater than a diffusivity of the first diffusion sub-regions (for example, the first diffusion sub-region 122a and the first diffusion sub-region 122e) corresponding to an edge portion of the first light spot SP1.

Generally, a shape of the light spot formed by the semiconductor laser is approximately elliptical, and a light intensity distribution thereof is similar to the Gaussian distribution. Since a unit area light intensity of a center of the light spot formed by the laser beam with the light intensity distribution similar to the Gaussian distribution is stronger, when the laser beam irradiates a first wavelength conversion region 132 (shown in FIG. 3) of the light wavelength conversion element 130, it causes a high temperature, resulting in decrease of the conversion efficiency of the first wavelength conversion region 132. Therefore, when the diffusivity of the two first diffusion sub-regions (for example, the first diffusion sub-region 122a and the first diffusion sub-region 122e) located at two opposite sides of the first diffusion sub-region (for example, the first diffusion sub-region 122c) corresponding to the central portion of the first light spot SP1 is smaller than the diffusivity of the first diffusion sub-region (for example, the first diffusion sub-region 122c) corresponding to the central portion of the first light spot SP1, the energy distribution of the light spot formed by the first beam L1 may be optimized to equalize the energy of the first beam L1 passing through the first diffusion region 122, such that the light spot energy is not excessively concentrated at the central portion, and the subsequent light wavelength conversion element 130 may have better light conversion efficiency and a wavelength conversion substance on the light wavelength conversion element 130 does not easily be damaged.

In detail, the first diffusion sub-region 122a to the first diffusion sub-region 122e of the embodiment may respectively have different diffusivities. Referring to FIG. 2B, in FIG. 2B, a longitudinal axis represents diffusivity, and the greater the diffusivity is, the greater the diffusion capability is, and the light beam passing the sub-region with greater diffusivity has a larger degree of divergence. The horizontal axis represents a radial position with respect to the center of the substrate S1, and the larger the radial position indicates the farther from the center of the substrate S1, where a position a, for example, corresponds to the first diffusion sub-region 122a, a position b, for example, corresponds to the first diffusion sub-region 122b, a position c, for example, corresponds to the first diffusion sub-region 122c, a position d, for example, corresponds to the first diffusion sub-region 122d, and a position e, for example, corresponds to the first diffusion sub-region 122e. As shown in FIG. 2B, diffusivities of a plurality of first diffusion sub-regions located at different radial positions of the substrate S1 may be different, where the diffusivity of the first diffusion sub-region 122c may be the largest, the diffusivities of the first diffusion sub-region 122b and the first diffusion sub-region 122d respectively located on opposite sides of the first diffusion sub-region 122c are secondary, and the diffusivities of the first diffusion sub-region 122a and the first diffusion sub-region 122e may be the smallest.

Further, the first diffusion sub-regions are, for example, configured with flyeye lenses, diffusion particles, Diffraction Optical Elements (DOEs), or other structures capable of providing a diffusion effect. When the first diffusion sub-regions are provided with the flyeye lenses, the diffusivities may be adjusted by adjusting curvatures of the microlenses. For example, a curvature of microlenses of the first diffusion sub-region 122c corresponding to the central portion of the first light spot SP1 may be greater than a curvature of microlenses of the first diffusion sub-region 122b and the first diffusion sub-region 122d, and the curvature of the microlenses of the first diffusion sub-region 122b and the first diffusion sub-region 122d is greater than a curvature of microlenses of the first diffusion sub-region 122a and the first diffusion sub-region 122e. When the first diffusion sub-regions are provided with the diffusion particles, the diffusivities may be adjusted by adjusting a particle size (haze) of the diffusion particles disposed on the first diffusion sub-regions. For example, a particle size (haze) of the first diffusion sub-region 122c corresponding to the central portion of the first light spot SP1 may be greater than a particle size (haze) of the first diffusion sub-region 122b and the first diffusion sub-region 122d, and the particle size (haze) of the first diffusion sub-region 122b and the first diffusion sub-region 122d is greater than a particle size (haze) of the first diffusion sub-region 122a and the first diffusion sub-region 122e. When the first diffusion sub-regions are provided with the DOEs, the diffusivities may be adjusted by adjusting a grating space thereof. for example, a grating space of the first diffusion sub-region 122c corresponding to the central portion of the first light spot SP1 may be smaller than a grating space of the first diffusion sub-region 122b and the first diffusion sub-region 122d, and the grating space of the first diffusion sub-region 122b and the first diffusion sub-region 122d is smaller than a grating space of the first diffusion sub-region 122a and the first diffusion sub-region 122e. In the embodiment, five first diffusion sub-regions are taken as an example for description, but the disclosure is not limited to the number of the first diffusion sub-regions.

Moreover, the plurality of first diffusion sub-regions (the first diffusion sub-region 122a to the first diffusion sub-region 122e) of the embodiment respectively have a discrete diffusivity, i.e. each of the first diffusion sub-regions has a single diffusivity, and the diffusivities of two adjacent first diffusion sub-regions are different and discontinuous (FIG. 2B presents a step-shaped diffusivity curve). However, in other embodiments, the diffusivities of two first diffusion sub-regions may also be continuous gradient (for example, the diffusivity curve is in a smooth and curved shape), and the disclosure is not limited thereto.

In the embodiment, when the diffusion rotating device 120 is rotated while taking the rotating axis RA1 as a center axis, the first diffusion region 122 and the optical region 124 are sequentially cut into the transmission path of the first beam L1. Since the first diffusion region 122 may diffuse the first beam L1, and the optical region 124 serving as the light penetration region allows the first beam L1 to directly pass through without diffusing the first beam L1, a divergence angle of the first beam L1 passing through the first diffusion region 122 is different to (greater than) a divergence angle of the first beam L1 passing through the optical region 124, and a light spot size of the first beam L1 passing through the first diffusion region 122 is different to (greater than) a light spot size of the first beam L1 passing through the optical region 124. Therefore, the diffusion rotating device 120 may individually adjust and optimize the light spot of the first beam L1 through different partitions, so that the first beam L1 passing through the diffusion rotating device 120 may have a different light spot energy density at different timing.

It should be noted that since the first beam L1 passing through the optical region 124 may serve as a blue light portion of the illumination beam IB, and the optical region 124 serving as the light penetration region allows the first beam L1 to directly pass through without diffusing the first beam L1, the first beam L1 passing through the optical region 124 may maintain the original collimation and high energy thereof, so as to maintain the efficiency of the blue light. Moreover, the diffusion rotating device 120 of the embodiment provides a diffusion effect to adjust a size, shape and energy distribution of the light spot, and does not have a color filtering function.

Figure 3:
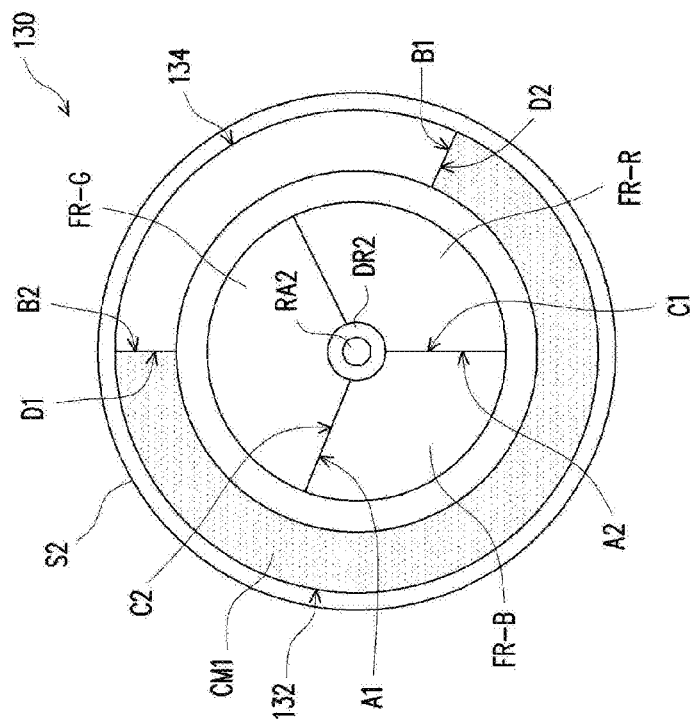
FIG. 3 is a front view of a light wavelength conversion element in FIG. 1.

FIG. 3 is a front view of the light wavelength conversion element in FIG. 1. Referring to FIG. 3, the light wavelength conversion element 130 may be a rotatable disk-like device, which includes a substrate S2, a rotating axis RA2 and a driving element DR2. The rotating axis RA2 is connected to the substrate S2. The driving element DR2 is connected to the rotating axis RA2, and is configured to drive the rotating axis RA2 to rotate and accordingly drive the substrate S2 to rotate. The substrate S2 includes a first wavelength conversion region 132 and an optical effect region 134 disposed adjacent to each other, and the substrate S2 is, for example, a reflective substrate or a transparent substrate coated with a reflection layer. The first wavelength conversion region 132 is provided with a wavelength conversion substance CM1, the wavelength conversion substance CM1 is, for example, yellow phosphor powder, and when the blue laser beam (the first beam L1) is incident to the first wavelength conversion region 132, the yellow phosphor powder may be excited by the blue laser beam (the first beam L1) to emit a yellow beam (a first converted beam CB1). The optical effect region 134 is, for example, a reflection region.

Referring to FIG. 2A and FIG. 3, an angle range covered by the first diffusion region 122 of the diffusion rotating device 120 with respect to the central axis (the rotating axis RA1) of the diffusion rotating device 120 is the same as an angle range covered by the first wavelength conversion region 132 of the light wavelength conversion element 130 with respect to the central axis (the rotating axis RA2) of the light wavelength conversion element 130, and an angle range covered by the optical region 124 of the diffusion rotating device 120 with respect to the central axis (the rotating axis RA1) of the diffusion rotating device 120 is the same as an angle range covered by the optical effect region 134 of the light wavelength conversion element 130 with respect to the central axis (the rotating axis RA2) of the light wavelength conversion element 130.

In the embodiment, when the substrate S2 of the light wavelength conversion element 130 is rotated while taking the rotating axis RA2 as a central axis, the first wavelength conversion region 132 and the optical effect region 134 (the reflection region) are sequentially cut into the transmission path of the first beam L1, where the first wavelength conversion region 132 is correspondingly cut into the transmission path of the first beam L1 coming from the first diffusion region 122 of the diffusion rotating device 120, and the optical effect region 134 (the reflection region) is correspondingly cut into the transmission path of the first beam L1 coming from the optical region 124 (the light penetration region) of the diffusion rotating device 120. When the first wavelength conversion region 132 is cut into the transmission path of the first beam L1 coming from the first diffusion region 122 of the diffusion rotating device 120, the first wavelength conversion region 132 converts the first beam L1 coming from the first diffusion region 122 into the first converted beam CB1 with a wavelength different with that of the first beam L1, and the first converted beam CB1 is reflected by the substrate S2. When the optical effect region 134 (the reflection region) is correspondingly cut into the transmission path of the first beam L1 coming from the optical region 124 (the light penetration region) of the diffusion rotating device 120, the optical effect region 134 (the reflection region) reflects the first beam L1 coming from the optical region 124 (the light penetration region).

In the embodiment, the light wavelength conversion element 130 further includes at least one filter region (for example, three filter regions including a red light filter region FR-R, a green light filter region FR-G and a blue light filter region FR-B disposed adjacent to each other in FIG. 3) used for filtering out beams other than those in a specific wavelength range and allowing the beams in the specific wavelength range to pass through, so as to improve a color purity of the color light. A radial distance of the at least one filter region (the red light filter region FR-R, the green light filter region FR-G and the blue light filter region FR-B) relative to the central axis (the rotating axis RA2) of the light wavelength conversion element 130 is different from a radial distance of the first wavelength conversion region 132 and the optical effect region 134 relative to the central axis (the rotating axis RA2) of the light wavelength conversion element 130. In the embodiment, a situation that the radial distance of the at least one filter region (the red light filter region FR-R, the green light filter region FR-G and the blue light filter region FR-B) relative to the central axis (the rotating axis RA2) of the light wavelength conversion element 130 is smaller than the radial distance of the first wavelength conversion region 132 and the optical effect region 134 relative to the central axis (the rotating axis RA2) of the light wavelength conversion element 130 is taken as an example for description, i.e. the at least one filter region (the red light filter region FR-R, the green light filter region FR-G and the blue light filter region FR-B) is located close to an inner ring of the substrate S2, and the first wavelength conversion region 132 and the optical effect region 134 are located close to an outer ring of the substrate S2, i.e. the first wavelength conversion region 132 and the optical effect region 134 located at the outer ring surround the red light filter region FR-R, the green light filter region FR-G and the blue light filter region FR-B located at the inner ring. Moreover, if the substrate S2 is a reflective substrate, the first wavelength conversion region 132 and the optical effect region 134 located at the outer ring are, for example, disposed on the substrate S2, and the red light filter region FR-R, the green light filter region FR-G and the blue light filter region FR-B located at the inner ring are, for example, a red filter, a green filter and a blue filter connected to the substrate S2. If the substrate S2 is a transparent substrate coated with a reflection layer, the first wavelength conversion region 132 and the optical effect region 134 located at the outer ring are, for example, disposed on the reflection layer of the substrate S2, and the red light filter region FR-R, the green light filter region FR-G and the blue light filter region FR-B located at the inner ring are, for example, corresponding filter films coated on the transparent substrate S2. However, in other embodiments, the radial distance of the at least one filter region (the red light filter region FR-R, the green light filter region FR-G and the blue light filter region FR-B) relative to the central axis (the rotating axis RA2) of the light wavelength conversion element 130 may be greater than the radial distance of the first wavelength conversion region 132 and the optical effect region 134 relative to the central axis (the rotating axis RA2) of the light wavelength conversion element 130, i.e. the at least one filter region (the red light filter region FR-R, the green light filter region FR-G and the blue light filter region FR-B) is located close to the outer ring of the substrate S2, and the first wavelength conversion region 132 and the optical effect region 134 are located close to the inner ring of the substrate S2.

In the embodiment, the filter element is integrated to the light wavelength conversion element 130, which avails reducing a volume and cost.

Referring to FIG. 1 again, the illumination system 100 of the embodiment further includes a light combining module 140 and a reflection mirror 150. The light combining module 140 is located between the first light source 110 and the light wavelength conversion element 130, and is located on the transmission path of the first beam L1 coming from the first light source 110. The light combining module 140 is also located on the transmission path of the first beam L1 and the first converted beam CB1 coming from the light wavelength conversion element 130. To be specific, the light combining module 140 may include a first dichroic unit 142 and a second dichroic unit 144. The first dichroic unit 142 is located on the transmission path of the first beam L1 coming from the first light source 110 and the transmission path of the first beam L1 and the first converted beam CB1 coming from the light wavelength conversion element 130. The second dichroic unit 144 is located on the transmission path of the first beam L1 coming from the light wavelength conversion element 130. The first dichroic unit 142 and the second dichroic unit 144 are, for example, Dichroic Mirrors (DMs) or dichroic prisms, which may provide different optical effects to light beams of different colors. For example, in the embodiment, the first dichroic unit 142 allows the blue beam to penetrate through, and provides a reflection effect to light beams of other colors (for example, red, green, yellow, etc.). The second dichroic unit 144, for example, provides the reflection effect to the blue beam. In some embodiments, a reflection mirror may be used to replace the second dichroic unit 144.

In the embodiment, the first dichroic unit 142 may be designed to allow the first beam L1 to penetrate through and reflect the first converted beam CB1. The second dichroic unit 144 may be designed to reflect the first beam L1. Therefore, the first dichroic unit 142 may transmit the first beam L1 coming from the first light source 110 and the diffusion rotating device 120 to the light wavelength conversion element 130, and respectively transmits the first beam L1 and the first converted beam CB1 coming from the light wavelength conversion element 130 to the second dichroic unit 144 and the reflection mirror 150, and after the second dichroic unit 144 reflects the first beam L1 to the first dichroic unit 142, the first beam L1 coming from the second dichroic unit 144 passes through the first dichroic unit 142 to the reflection mirror 150.

Then, the reflection mirror 150 transmits the first converted beam CB1 and the first beam L1 coming from the light combining module 140 to the light wavelength conversion element 130 at different timing, where the red light filter region FR-R and the green light filter region FR-G of the light wavelength conversion element 130 are correspondingly cut into the transmission path of the first converted beam CB1 coming from the first wavelength conversion region 132, and the blue light filter region FR-B of the light wavelength conversion element 130 is correspondingly cut into the transmission path of the first beam L1 coming from the optical effect region 134 (the reflection region). When the first converted beam CB1 (for example, the yellow beam) is transmitted to the red light filter region FR-R or the green light filter region FR-G, the first converted beam CB1 is filtered to form a red beam or a green beam. When the first beam L1 (the blue laser beam) is transmitted to the blue light filter region FR-B, the first beam L1 passes through to, for example, serve as a blue beam.

By configuring the light combining module 140 and the reflection mirror 150, the first converted beam CB1 and the first beam L1 coming from a first side of the light wavelength conversion element 130 may be transmitted to a second side of the light wavelength conversion element 130, where the first side and the second side are opposite to each other, i.e. the first side and the second side are respectively two opposite sides of the rotating axis RA2. Therefore, an azimuth angle range covered by the blue light filter region FR-B with respect to the central axis (the rotating axis RA2) is rotated by 180 degrees compared with an azimuth angle range covered by the optical effect region 134 (the reflection region) with respect to the central axis (the rotating axis RA2). Namely, an azimuth angle of the blue light filter region FR-B at a boundary A1 in a clockwise direction and an azimuth angle of the optical effect region 134 (the reflection region) at a boundary B1 in the clockwise direction have a difference of 180 degrees, and an azimuth angle of the blue light filter region FR-B at a boundary A2 in an anticlockwise direction and an azimuth angle of the optical effect region 134 (the reflection region) at a boundary B2 in the anticlockwise direction have a difference of 180 degrees. Similarly, an azimuth angle range covered by the red light filter region FR-R and the green light filter region FR-G with respect to the central axis (the rotating axis RA2) is rotated by 180 degrees compared with an azimuth angle range covered by the first wavelength conversion region 132 with respect to the central axis (the rotating axis RA2). Namely, an azimuth angle of the red light filter region FR-R and the green light filter region FR-G at a boundary C1 in the clockwise direction and an azimuth angle of the first wavelength conversion region 132 at a boundary D1 in the clockwise direction have a difference of 180 degrees, and an azimuth angle of the red light filter region FR-R and the green light filter region FR-G at a boundary C2 in the anticlockwise direction and an azimuth angle of the first wavelength conversion region 132 at a boundary D2 in the anticlockwise direction have a difference of 180 degrees.

Referring to FIG. 1, the illumination system 100 of the embodiment further includes a light collecting element 160 and a plurality of lenses (a lens O1 to a lens O6 in FIG. 1). The light collecting element 160 is disposed on the transmission path of the first converted beam CB1 and the first beam L1 coming from the at least one filter region, and is configured to uniform the red beam, the green beam and the blue beam formed from the first converted beam CB1 and the first beam L1 to form an illumination beam B3. Namely, the illumination beam B3 of the embodiment includes the color beams formed from the first converted beam CB1 and the first beam L1. In the embodiment, the light collecting element 160 is, for example, an integration rod, but the disclosure is not limited thereto. The lenses (the lens O1 to the lens O6) are configured to adjust internal beam paths of the illumination system 100.

It should be noted that a part of contents of the aforementioned embodiment is also used in the following embodiment, and descriptions of the same technical contents are omitted. The aforementioned embodiment may be referred for descriptions of the same components, and detailed descriptions thereof are not repeated in the following embodiment.

Figure 4:
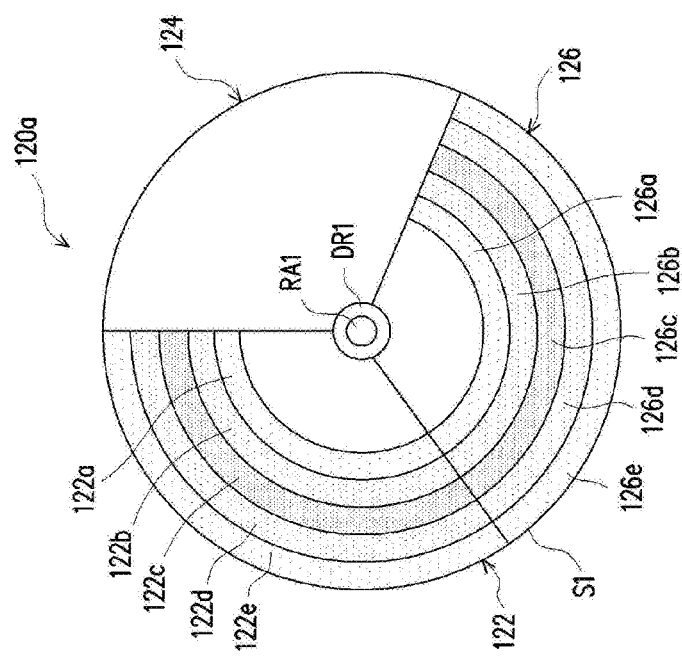
FIG. 4 is a front view of another diffusion rotating device according to the first embodiment of the disclosure.
Figure 5:
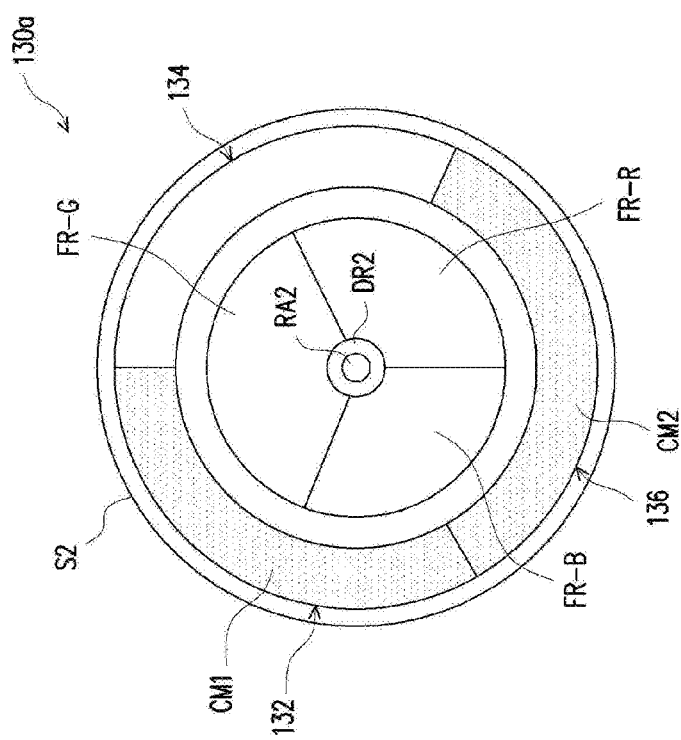
FIG. 5 is a front view of another light wavelength conversion element corresponding to FIG. 4.

FIG. 4 is a front view of another diffusion rotating device according to the first embodiment of the disclosure. FIG. 5 is a front view of another light wavelength conversion element corresponding to FIG. 4. A diffusion rotating device 120a and a light wavelength conversion element 130a in FIG. 4 and FIG. 5 are similar to the diffusion rotating device 120 and the light wavelength conversion element 130 in FIG. 2A and FIG. 3, and the main differences therebetween are that the diffusion rotating device 120a of FIG. 4 further includes a second diffusion region 126, and the light wavelength conversion element 130a of FIG. 5 further includes a second wavelength conversion region 136.

Referring to FIG. 4 first, the substrate S1 of the diffusion rotating device 120a includes the first diffusion region 122, the optical region 124 and the second diffusion region 126. The second diffusion region 126 has a plurality of second diffusion sub-regions (for example, a second diffusion sub-region 126a to a second diffusion sub-region 126e shown in FIG. 4), wherein each of the second diffusion sub-regions (the second diffusion sub-region 126a to the second diffusion sub-region 126e) extends along the circumferential direction of the substrate S1 of the diffusion rotating device 120a and the second diffusion sub-regions (the second diffusion sub-region 126a to the second diffusion sub-region 126e) are arranged concentrically along the radial direction of the substrate S1.

In the embodiment, when the substrate S1 of the diffusion rotating device 120a is rotated while taking the rotating axis RA1 as a central axis, the first diffusion region 122, the optical region 124 and the second diffusion region 126 are sequentially cut into the transmission path of the first beam L1. When the first diffusion region 122 of the diffusion rotating device 120a is cut into the transmission path of the first beam L1, the first beam L1 forms the aforementioned first light spot SP1 on the first diffusion region 122 of the substrate S1. When the second diffusion region 126 of the diffusion rotating device 120a is cut into the transmission path of the first beam L1, the first beam L1 forms a second light spot (a range of the second light spot may, for example, cover at least two of the second diffusion sub-region 126a to the second diffusion sub-region 126e) on the second diffusion region 126 of the substrate S1, and in the radial direction of the substrate S1, a diffusivity of the second diffusion sub-region (for example, the second diffusion sub-region 126c) corresponding to a central portion of the second light spot in the plurality second diffusion sub-regions is greater than a diffusivity of the second diffusion sub-regions (for example, the second diffusion sub-region 126a and the second diffusion sub-region 126e) corresponding to an edge portion of the second light spot.

The second diffusion region 126 of the embodiment is similar to the first diffusion region 122, and the aforementioned embodiment may be referred for related descriptions of the second diffusion region 126, and details thereof are not repeated. A main difference between the first diffusion region 122 and the second diffusion region 126 is that the first diffusion region 122 and the second diffusion region 126 are different diffusion elements, wherein an overall diffusivity of the first diffusion region 122 is different to an overall diffusivity of the second diffusion region 126, so that a divergence angle of the first beam L1 passing through the first diffusion region 122 is different to a divergence angle of the first beam L1 passing through the second diffusion region 126, and a light spot size of the first beam L1 passing through the first diffusion region 122 is different to (greater than) a light spot size of the first beam L1 passing through the second diffusion region 126. Therefore, the diffusion rotating device 120a may individually adjust and optimize the light spot of the first beam L1 through different partitions, so that the first beam L1 passing through the diffusion rotating device 120a may have a different light spot energy density at different timing.

Moreover, in the embodiment, the first diffusion region 122 has a plurality of first diffusion sub-regions (the first diffusion sub-region 122a to the first diffusion sub-region 122e), and the second diffusion region 126 has a plurality of second diffusion sub-regions (the second diffusion sub-region 126a to the second diffusion sub-region 126e). However, in other embodiments, the first diffusion region 122 may have a plurality of first diffusion sub-regions (the first diffusion sub-region 122a to the first diffusion sub-region 122e), and the second diffusion region 126 only has a single diffusivity and does not have a plurality of second diffusion sub-regions. Alternatively, the second diffusion region 126 may have a plurality of second diffusion sub-regions (the second diffusion sub-region 126a to the second diffusion sub-region 126e), and the first diffusion region 122 only has a single diffusivity and does not have a plurality of first diffusion sub-regions.

Referring to FIG. 5, the substrate S2 of the light wavelength conversion element 130a includes the first wavelength conversion region 132, the optical effect region 134 and the second wavelength conversion region 136 disposed adjacent to each other. The first wavelength conversion region 132 is provided with a wavelength conversion substance CM1, and the second wavelength conversion region 136 is configured with a wavelength conversion substance CM2. The wavelength conversion substance CM1 is different to the wavelength conversion substance CM2. The wavelength conversion substance CM1 is, for example, yellow phosphor powder or a red phosphor powder, and when the blue laser beam (the first beam L1) is incident to the wavelength conversion substance CM1 of the first wavelength conversion region 132, the yellow phosphor powder or the red phosphor powder may be excited by the blue laser beam (the first beam L1) to emit a yellow beam or a red beam (a first converted beam). The wavelength conversion substance CM2 is, for example, a green phosphor powder, and when the blue laser beam (the first beam L1) is incident to the wavelength conversion substance CM2 of the second wavelength conversion region 136, the green phosphor powder may be excited by the blue laser beam (the first beam L1) to emit a green beam (a second converted beam).

Referring to FIG. 4 and FIG. 5, an angle range covered by the first diffusion region 122 of the diffusion rotating device 120a with respect to the central axis (the rotating axis RA1) of the diffusion rotating device 120a is the same as an angle range covered by the first wavelength conversion region 132 of the light wavelength conversion element 130a with respect to the central axis (the rotating axis RA2) of the light wavelength conversion element 130a, and an angle range covered by the optical region 124 of the diffusion rotating device 120a with respect to the central axis (the rotating axis RA1) of the diffusion rotating device 120a is the same as an angle range covered by the optical effect region 134 of the light wavelength conversion element 130a with respect to the central axis (the rotating axis RA2) of the light wavelength conversion element 130a, and an angle range covered by the second diffusion region 126 of the diffusion rotating device 120a with respect to the central axis (the rotating axis RA1) of the diffusion rotating device 120a is the same as an angle range covered by the second wavelength conversion region 136 of the light wavelength conversion element 130a with respect to the central axis (the rotating axis RA2) of the light wavelength conversion element 130a.

Referring to FIG. 1, FIG. 4 and FIG. 5, In the embodiment, when the substrate S2 of the light wavelength conversion element 130a is rotated while taking the rotating axis RA2 as a central axis, the first wavelength conversion region 132, the optical effect region 134 (the reflection region) and the second wavelength conversion region 136 are sequentially cut into the transmission path of the first beam L1 coming from the first light source 110, wherein the first wavelength conversion region 132 is correspondingly cut into the transmission path of the first beam L1 coming from the first diffusion region 122 of the diffusion rotating device 120a, the optical effect region 134 (the reflection region) is correspondingly cut into the transmission path of the first beam L1 coming from the optical region 124 (the light penetration region) of the diffusion rotating device 120a, and the second wavelength conversion region 136 is correspondingly cut into the transmission path of the first beam L1 coming from the second diffusion region 126 of the diffusion rotating device 120a. When the first wavelength conversion region 132 is cut into the transmission path of the first beam L1 coming from the first diffusion region 122, the first wavelength conversion region 132 converts the first beam L1 coming from the first diffusion region 122 into the first converted beam CB1 with a wavelength different from that of the first beam L1, and the first converted beam CB1 is reflected by the substrate S2. When the optical effect region 134 (the reflection region) is correspondingly cut into the transmission path of the first beam L1 coming from the optical region 124 (the light penetration region), the optical effect region 134 (the reflection region) reflects the first beam L1 coming from the optical region 124 (the light penetration region). When the second wavelength conversion region 136 is cut into the transmission path of the first beam L1 coming from the second diffusion region 126, the second wavelength conversion region 136 converts the first beam L1 coming from the second diffusion region 126 into a second converted beam CB2 with a wavelength different with that of the first beam L1, and the second converted beam CB2 is then reflected by the substrate S2.

Since the wavelength conversion substance CM1 and the wavelength conversion substance CM2 are different materials, different substances may have different heat resistance. For example, a heat resistance of the red phosphor powder is lower than that of the yellow phosphor powder or the green phosphor powder, so the light spot size of the first beam L1 may be adjusted according to the heat resistances of different wavelength conversion substances, so as to improve the individual conversion efficiency. In the embodiment, when the wavelength conversion substance CM1 is the red phosphor powder, the heat resistance of the wavelength conversion substance CM1 is lower than the heat resistance of the wavelength conversion substance CM2, so that an overall diffusivity of the first diffusion region 122 corresponding to the first wavelength conversion region 132 may be greater than an overall diffusivity of the second diffusion region 126 corresponding to the second wavelength conversion region 136. Therefore, a divergence angle of the first beam L1 passing through the first diffusion region 122 may be greater than a divergence angle of the first beam L1 passing through the second diffusion region 126, and a light spot size of the first beam L1 passing through the first diffusion region 122 may be greater than a light spot size of the first beam L1 passing through the second diffusion region 126.

In other embodiments, the light wavelength conversion element may have other number of the wavelength conversion regions, so that the diffusion rotating device may have the corresponding number of the diffusion regions to respectively optimize the different wavelength conversion regions.

It should be noted that when the light wavelength conversion element of FIG. 1 adopts the light wavelength conversion element 130 of FIG. 3, the illumination system does not have the second converted beam CB2, and when the light wavelength conversion element of FIG. 1 adopts the light wavelength conversion element 130a of FIG. 5, the illumination system may have the second converted beam CB2, and the second converted beam CB2 has substantially the same optical path as that of the first converted beam CB1. Therefore, in FIG. 1, the second converted beam CB2 is indicated in brackets, and the second converted beam CB2 and the first converted beam CB1 are represented by the same optical path.

Figure 6:
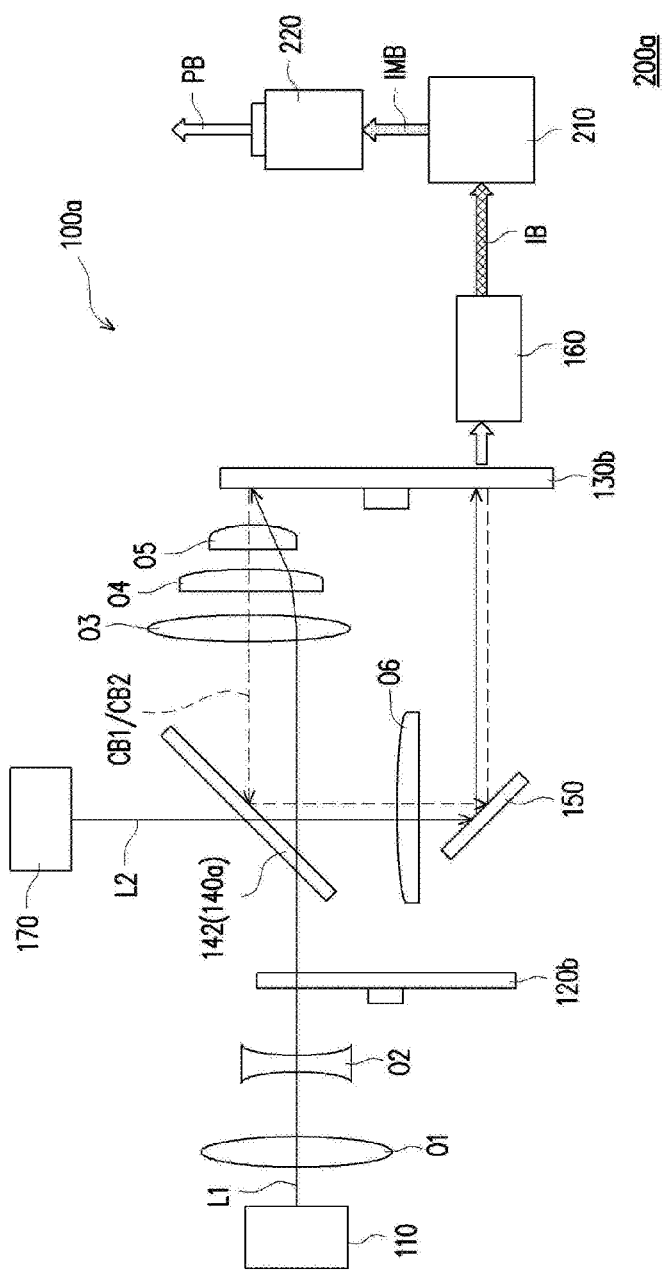
FIG. 6 is a schematic diagram of a projection device according to a second embodiment of the disclosure.

FIG. 6 is a schematic diagram of a projection device according to a second embodiment of the disclosure. Referring to FIG. 6, the projection device 200a of the embodiment is similar to the projection device 200 of FIG. 1, and a main difference therebetween is that the illumination system 100a of the projection device 200a further includes a second light source 170. The second light source 170 is configured to emit a second beam L2, and a wavelength of the second beam L2 is different with that of the first converted beam CB1 or the second converted beam CB2. In the embodiment, the second light source 170 is similar to the first light source 110, and the second beam L2 may be used as a blue light portion of the illumination beam IB, and the first beam L1 may be only used as an excitation beam used for exciting the wavelength conversion substance. Therefore, the light wavelength conversion element 130b of the embodiment may be similar with the light wavelength conversion element 130a of FIG. 5, but the optical effect region 134 shown in FIG. 5 may be omitted, and the diffusion rotating device 120b of the embodiment may be similar with the diffusion rotating device 120a of FIG. 4, but the optical region 124 shown in FIG. 4 may be omitted. Moreover, the light combining module 140a of the embodiment may not include the second dichroic unit 144.

In the embodiment, the first beam L1 emitted by the first light source 110 has a first wavelength, the second beam L2 emitted by the second light source 170 has a second wavelength, and the first wavelength may be different from the second wavelength. For example, the first wavelength is, for example, 455 nm, and the second wavelength is, for example, 465 nm. However, in other embodiments, the first wavelength may also be the same as the second wavelength, which is not limited by the disclosure.

In the embodiment, the first dichroic unit 142 (the light combining module 140a) may be designed to allow the first beam L1 and the second beam L2 to penetrate through and reflect the first converted beam CB1 and the second converted beam CB2. Therefore, the first dichroic unit 142 may transmit the first beam L1 coming from the first light source 110 to the light wavelength conversion element 130b, and transmit the first converted beam CB1 and the second converted beam CB2 coming from the light wavelength conversion element 130b and the second beam L2 coming from the second light source 170 to the reflection mirror 150. Then, the reflection mirror 150 transmit the first converted beam CB1, the second converted beam CB2 and the second beam L2 coming from the light combining module 140a to the at least one filter region (the red light filter region FR-R, the green light filter region FR-G and the blue light filter region FR-B) of the light wavelength conversion element 130b and the light collecting element 160 at different timings, so as to form the illumination beam IB, i.e. the illumination beam IB of the embodiment includes the first converted beam CB1, the second converted beam CB2 and the second beam L2.

Figure 7:
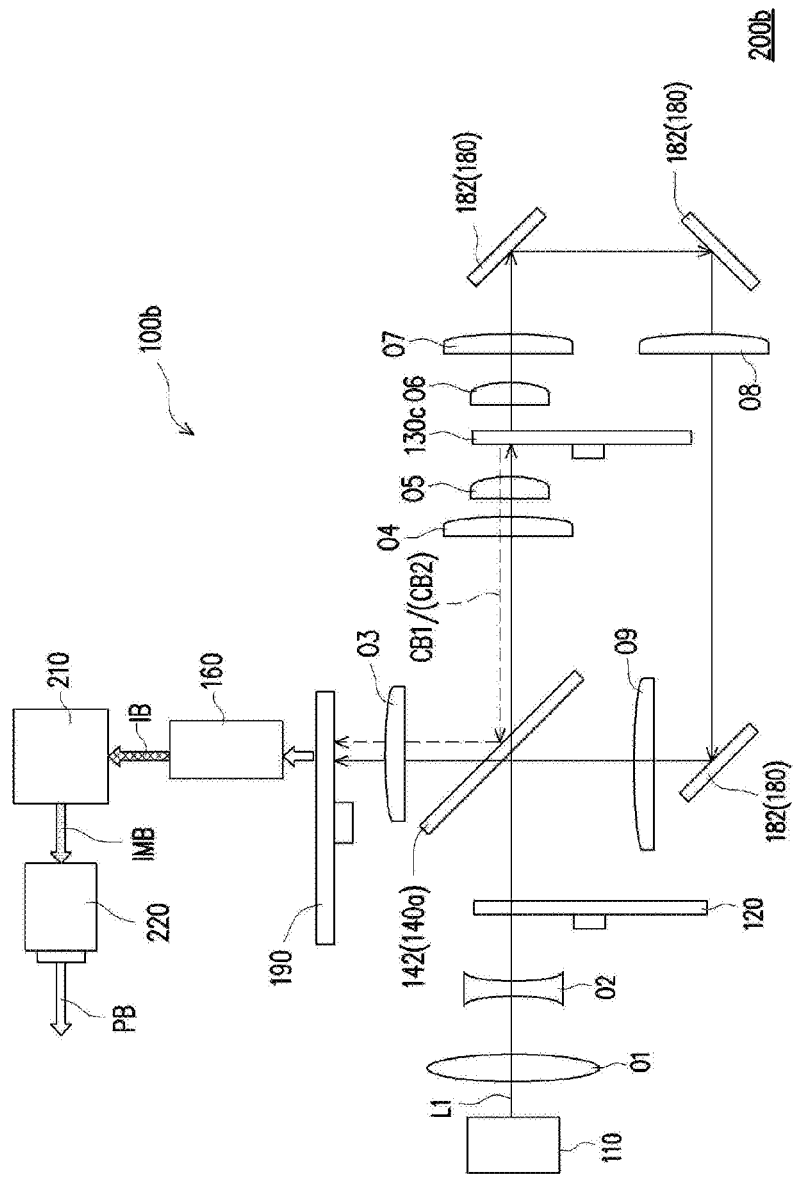
FIG. 7 is a schematic diagram of a projection device according to a third embodiment of the disclosure.

FIG. 7 is a schematic diagram of a projection device according to a third embodiment of the disclosure. Referring to FIG. 7, the projection device 200b of the embodiment is similar to the projection device 200 of FIG. 1, and a main difference therebetween is that the optical effect region 134 of the light wavelength conversion element 130c of the projection device 200b is a transparent region, which allows the first beam L1 coming from the optical region 124 (the light penetration region) 124 to pass through, and the light combining module 140a of the embodiment may not include the second dichroic unit 144. Moreover, the illumination system 100b of the embodiment further includes a filter element 190 (for example, a filter wheel) disposed between the light combining module 140a and the light collecting element 160, which is used for enhancing color purity of color light, so that the light wavelength conversion element 130c of the embodiment may omit configuring the filter regions.

In the embodiment, the illumination system 100b further includes a light transmitting module 180 used for transmitting the first beam L1 penetrating through the optical effect region 134 (the transparent region) back to the light combining module 140a. The light transmitting module 180 is, for example, composed of a plurality of reflection mirrors 182. Moreover, the lenses (the lens O1 to the lens O9) are used for adjusting the internal optical paths of the illumination system 100b.

Figure 8:
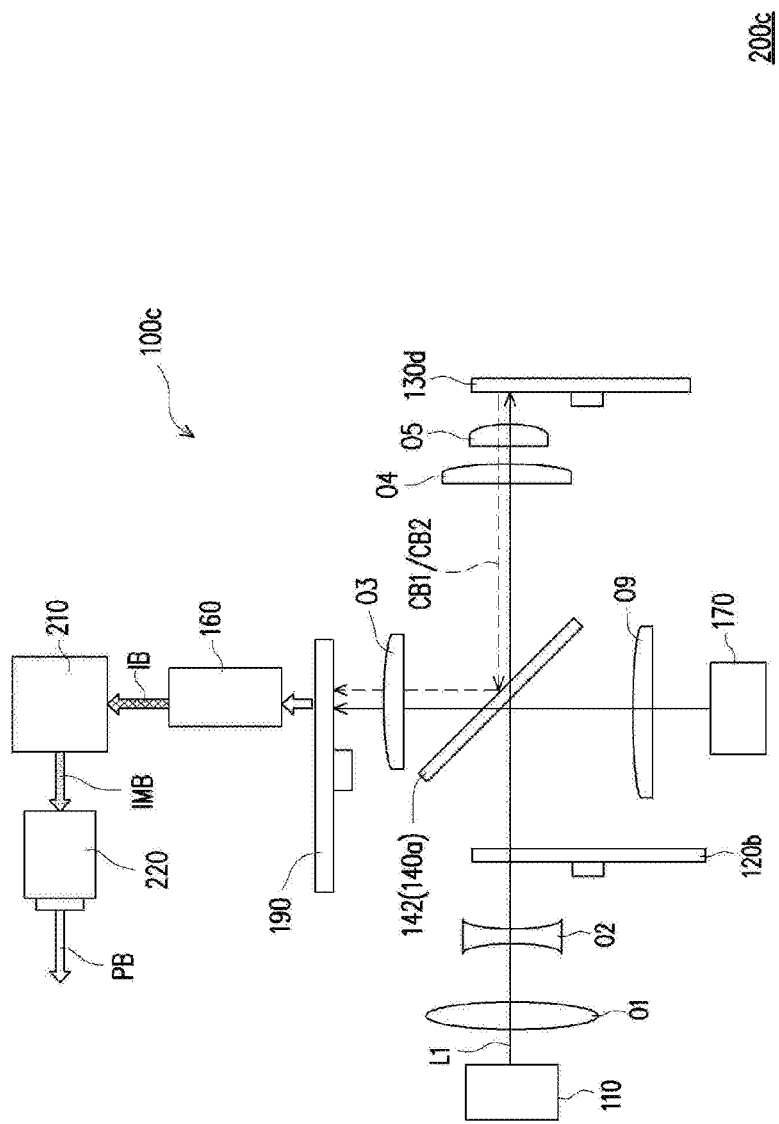
FIG. 8 is a schematic diagram of a projection device according to a fourth embodiment of the disclosure.

FIG. 8 is a schematic diagram of a projection device according to a fourth embodiment of the disclosure. Referring to FIG. 8, the projection device 200c of the embodiment is similar to the projection device 200b of FIG. 7, and a main difference therebetween is that the projection device 200c further includes the second light source 170. The second embodiment may be referred for related description of the second light source 170, and detail thereof is not repeated.

Moreover, the light wavelength conversion element 130d of the embodiment may omit configuring the optical effect region 134 shown in FIG. 5, and the diffusion rotating device 120b of the embodiment may omit configuring the optical region 124 shown in FIG. 4, and the projection device 100c does not have the light transmitting module 180 of FIG. 7.

In the embodiment, the first dichroic unit 142 (the light combining module 140a) may be designed to allow the first beam L1 and the second beam L2 to penetrate through and reflect the first converted beam CB1 and the second converted beam CB2. Therefore, the first dichroic unit 142 may transmit the first beam L1 coming from the first light source 110 to the light wavelength conversion element 130d, and transmit the first converted beam CB1 and the second converted beam CB2 coming from the light wavelength conversion element 130d and the second beam L2 coming from the second light source 170 to the filter element 190 and the light collecting element 160 to form the illumination beam B3.

In summary, the embodiments of the disclosure have at least one of following advantages or effects. The driving element of the diffusion rotating device of the disclosure is configured to drive the rotating axis connected to the substrate to rotate, and the substrate of the diffusion rotating device includes the first diffusion region and the optical region disposed adjacent to each other, so that the diffusion rotating device may individually optimize the light spot of the light beam (first beam) through different partitions, and the light beam passing through the diffusion rotating device may have different light spot energy density at different timings. Moreover, the first diffusion region has a plurality of first diffusion sub-regions, and when the first diffusion region is cut into the transmission path of the light beam, the light beam forms a first light spot on the first diffusion region of the substrate, and in the radial direction of the substrate, a diffusivity of the first diffusion sub-region corresponding to a central portion of the first light spot in the plurality of first diffusion sub-regions is greater than a diffusivity of the first diffusion sub-regions corresponding to an edge portion of the first light spot. Therefore, the first diffusion sub-regions may further adjust and optimize the energy distribution of the light spot, so that the energy of the light spot is not excessively concentrated in the central portion. In this way, the projection device applying the diffusion rotating device may implement individual optimization on different partitions of the light wavelength conversion region. Moreover, the light spot energy of the light beam irradiating the first wavelength conversion region is not excessively concentrated to the central portion, which results in better light conversion efficiency and the light wavelength conversion element does not easily be damaged. Therefore, the projection device of the disclosure has good optical efficiency.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A diffusion rotating device, disposed on a transmission path of a light beam, comprising:
a substrate;
a rotating axis, connected to the substrate; and
a driving element, connected to the rotating axis, and configured to drive the rotating axis to rotate,
wherein the substrate comprises a first diffusion region and an optical region disposed adjacent to each other, and the first diffusion region has a plurality of first diffusion sub-regions, wherein each of the plurality of first diffusion sub-regions extends along a circumferential direction of the substrate and the plurality of first diffusion sub-regions are arranged concentrically along a radial direction of the substrate, wherein when the first diffusion region is cut into the transmission path of the light beam, the light beam forms a first light spot on the first diffusion region of the substrate, and in the radial direction of the substrate, a diffusivity of the first diffusion sub-region corresponding to a central portion of the first light spot in the plurality of first diffusion sub-regions is greater than a diffusivity of the first diffusion sub-region corresponding to an edge portion of the first light spot,
wherein when the first diffusion region and the optical region are sequentially cut into the transmission path of the light beam, a divergence angle of the light beam passing through the first diffusion region is different to a divergence angle of the light beam passing through the optical region.

2. The diffusion rotating device as claimed in claim 1, wherein in the radial direction of the substrate, a diffusivity of the two first diffusion sub-regions located at two opposite sides of the first diffusion sub-region corresponding to the central portion of the first light spot is smaller than the diffusivity of the first diffusion sub-region corresponding to the central portion of the first light spot, such that energy of the light beam passing through the plurality of first diffusion sub-regions is uniformed.

3. The diffusion rotating device as claimed in claim 1, wherein the optical region is a light penetration region.

4. A diffusion rotating device, disposed on a transmission path of a light beam, comprising:
a substrate;
a rotating axis, connected to the substrate; and
a driving element, connected to the rotating axis, and configured to drive the rotating axis to rotate,
wherein the substrate comprises a first diffusion region and an optical region disposed adjacent to each other, and the first diffusion region has a plurality of first diffusion sub-regions, wherein each of the plurality of first diffusion sub-regions extends along a circumferential direction of the substrate and the plurality of first diffusion sub-regions are arranged concentrically along a radial direction of the substrate, wherein when the first diffusion region is cut into the transmission path of the light beam, the light beam forms a first light spot on the first diffusion region of the substrate, and in the radial direction of the substrate, a diffusivity of the first diffusion sub-region corresponding to a central portion of the first light spot in the plurality of first diffusion sub-regions is greater than a diffusivity of the first diffusion sub-region corresponding to an edge portion of the first light spot, wherein when the first diffusion region and the optical region are sequentially cut into the transmission path of the light beam, a size of a light spot formed by the light beam passing through the first diffusion region is different to a size of a light spot formed by the light beam passing through the optical region.

5. A diffusion rotating device, disposed on a transmission path of a light beam, comprising:
a substrate;
a rotating axis, connected to the substrate; and
a driving element, connected to the rotating axis, and configured to drive the rotating axis to rotate,
wherein the substrate comprises a first diffusion region and an optical region disposed adjacent to each other, and the first diffusion region has a plurality of first diffusion sub-regions, wherein each of the plurality of first diffusion sub-regions extends along a circumferential direction of the substrate and the plurality of first diffusion sub-regions are arranged concentrically along a radial direction of the substrate, wherein when the first diffusion region is cut into the transmission path of the light beam, the light beam forms a first light spot on the first diffusion region of the substrate, and in the radial direction of the substrate, a diffusivity of the first diffusion sub-region corresponding to a central portion of the first light spot in the plurality of first diffusion sub-regions is greater than a diffusivity of the first diffusion sub-region corresponding to an edge portion of the first light spot, wherein the optical region is a second diffusion region, and the first diffusion region and the second diffusion region are respectively different diffusion elements, wherein an overall diffusivity of the first diffusion region is different to an overall diffusivity of the second diffusion region.

6. The diffusion rotating device as claimed in claim 5, wherein the second diffusion region has a plurality of second diffusion sub-regions, wherein each of the plurality of second diffusion sub-regions extends along the circumferential direction of the substrate and the plurality of second diffusion sub-regions are arranged concentrically along the radial direction of the substrate, wherein when the second diffusion region is cut into the transmission path of the light beam, the light beam forms a second light spot on the second diffusion region of the substrate, and in the radial direction of the substrate, a diffusivity of the second diffusion sub-region corresponding to a central portion of the second light spot in the plurality second diffusion sub-regions is greater than a diffusivity of the second diffusion sub-region corresponding to an edge portion of the second light spot in the plurality second diffusion sub-regions.

7. The diffusion rotating device as claimed in claim 5, wherein the substrate further comprises a light penetration region.

8. A projection device, comprising:
- an illumination system, configured to provide an illumination beam, and the illumination system comprising:
- a first light source, configured to emit a first beam;
- a diffusion rotating device, disposed on a transmission path of the first beam, and the diffusion rotating device comprising a first diffusion region and an optical region disposed adjacent to each other, and the first diffusion region and the optical region being sequentially cut into the transmission path of the first beam, wherein the first diffusion region has a plurality of first diffusion sub-regions, each of the plurality of first diffusion sub-regions extends along a circumferential direction of the diffusion rotating device and the plurality of first diffusion sub-regions are arranged concentrically along a radial direction of the diffusion rotating device, wherein when the first diffusion region is cut into the transmission path of the first beam, the first beam forms a first light spot on the first diffusion region, and in the radial direction of the diffusion rotating device, a diffusivity of the first diffusion sub-region corresponding to a central portion of the first light spot in the plurality of first diffusion sub-regions is greater than a diffusivity of the first diffusion sub-region corresponding to an edge portion of the first light spot; and
- a light wavelength conversion element, disposed on the transmission path of the first beam coming from the diffusion rotating device, and the light wavelength conversion element comprising a first wavelength conversion region and an optical effect region disposed adjacent with each other, wherein the first wavelength conversion region is correspondingly cut into the transmission path of the first beam coming from the first diffusion region, and the optical effect region is correspondingly cut into the transmission path of the first beam coming from the optical region, and the first wavelength conversion region is configured to convert the first beam coming from the first diffusion region into a first converted beam, and the illumination beam comprises the first converted beam;
- at least one light valve, disposed on a transmission path of the illumination beam to modulate the illumination beam into an image beam; and
- a projection lens, disposed on a transmission path of the image beam.

9. The projection device as claimed in claim 8, wherein in the radial direction of the diffusion rotating device, a diffusivity of the two first diffusion sub-regions located at two opposite sides of the first diffusion sub-region corresponding to the central portion of the first light spot is smaller than the diffusivity of the first diffusion sub-region corresponding to the central portion of the first light spot, such that energy of the first beam passing through the plurality of first diffusion sub-regions is uniformed.

10. The projection device as claimed in claim 8, wherein a divergence angle of the first beam passing through the first diffusion region is different to a divergence angle of the first beam passing through the optical region.

11. The projection device as claimed in claim 8, wherein a size of a light spot formed on the first wavelength conversion region by the first beam passing through the first diffusion region is different to a size of a light spot formed on the optical effect region by the first beam passing through the optical region.

12. The projection device as claimed in claim 8, wherein the optical region of the diffusion rotating device is a light penetration region, and an optical effect region of the light wavelength conversion element is a transparent region or a reflection region to allow the first beam coming from the light penetration region to pass through or reflect the first beam coming from the light penetration region.

13. The projection device as claimed in claim 8, wherein the optical region of the diffusion rotating device is a second diffusion region, and the first diffusion region and the second diffusion region are respectively different diffusion elements, wherein an overall diffusivity of the first diffusion region is different to an overall diffusivity of the second diffusion region, and wherein an optical effect region of the light wavelength conversion element is a second wavelength conversion region, and the second wavelength conversion region is configured to convert the first beam coming from the second diffusion region into a second converted beam.

14. The projection device as claimed in claim 13, wherein the second diffusion region has a plurality of second diffusion sub-regions, each of the plurality of second diffusion sub-regions extends along a circumferential direction of the diffusion rotating device, and the plurality of second diffusion sub-regions are arranged concentrically along the radial direction of the diffusion rotating device, wherein when the second diffusion region is cut into the transmission path of the first beam, the first beam forms a second light spot on the second diffusion region, and in the radial direction of the diffusion rotating device, a diffusivity of the second diffusion sub-region corresponding to a central portion of the second light spot in the plurality of second diffusion sub-regions is greater than a diffusivity of the second diffusion sub-region corresponding to an edge portion of the second light spot.

15. The projection device as claimed in claim 13, wherein the diffusion rotating device further comprises a light penetration region, the first diffusion region, the second diffusion region and the light penetration region are sequentially cut into the transmission path of the first beam, and the light wavelength conversion element further comprises a transparent region or a reflection region to allow the first beam coming from the light penetration region to pass through or reflect the first beam coming from the light penetration region.

16. The projection device as claimed in claim 13, wherein the first wavelength conversion region is provided with a first wavelength conversion substance, and the second wavelength conversion region is provided with a second wavelength conversion substance, wherein a heat resistance of the first wavelength conversion substance is smaller than a heat resistance of the second wavelength conversion substance, and an overall diffusivity of the first diffusion region is greater than an overall diffusivity of the second diffusion region.

17. The projection device as claimed in claim 8, wherein an angle range covered by the first diffusion region of the diffusion rotating device with respect to a central axis of the diffusion rotating device is the same as an angle range covered by the first wavelength conversion region of the light wavelength conversion element with respect to a central axis of the light wavelength conversion element, and an angle range covered by the optical region of the diffusion rotating device with respect to the central axis of the diffusion rotating device is the same as an angle range covered by the optical effect region of the light wavelength conversion element with respect to the central axis of the light wavelength conversion element.

18. The projection device as claimed in claim 8, wherein the illumination system further comprises a second light source and a light collecting element, wherein the second light source is configured to emit a second beam; and the light collecting element is configured to form the illumination beam, and the light collecting element is at least disposed on a transmission path of the first converted beam and the second beam, and the illumination beam comprises the second beam.

19. The projection device as claimed in claim 8, wherein the light wavelength conversion element further comprises at least one filter region, a radial distance of the at least one filter region relative to a central axis of the light wavelength conversion element is different from a radial distance of the first wavelength conversion region and the optical effect region relative to the central axis of the light wavelength conversion element.

\* \* \* \* \*